United States Patent
Lee et al.

(10) Patent No.: US 9,500,470 B2
(45) Date of Patent: Nov. 22, 2016

(54) APPARATUS AND METHOD FOR MEASURING QUALITY OF HOLOGRAPHIC IMAGE

(71) Applicant: Electronics and Telecommunications Research Institute, Daejeon (KR)

(72) Inventors: Soo Hyun Lee, Daejeon (KR); Je Ho Nam, Daejeon (KR); Jin Woong Kim, Daejeon (KR); Kyung Ae Moon, Daejeon (KR); Eun Young Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/703,988

(22) Filed: May 5, 2015

(65) Prior Publication Data

US 2016/0040983 A1 Feb. 11, 2016

(30) Foreign Application Priority Data

Aug. 11, 2014 (KR) ........................ 10-2014-0103922

(51) Int. Cl.
*G01B 9/021* (2006.01)
*G01B 11/02* (2006.01)
*G03H 1/22* (2006.01)

(52) U.S. Cl.
CPC ........... *G01B 11/026* (2013.01); *G03H 1/2249* (2013.01); *G03H 2001/221* (2013.01); *G03H 2001/2247* (2013.01); *G03H 2001/2281* (2013.01); *G03H 2223/19* (2013.01)

(58) Field of Classification Search
CPC ............. G01B 11/026; G03H 1/2249; G03H 1/0486; G03H 1/2294; G03H 2001/221; G03H 2001/2247; G03H 2001/2281; G03H 2001/0434; G03H 2001/2271; G03H 2223/19
USPC ........................................................ 356/457
See application file for complete search history.

(56) References Cited

U.S. PATENT DOCUMENTS

| | | | | |
|---|---|---|---|---|
| 6,014,219 A | * | 1/2000 | Yamate | G03H 1/00 356/394 |
| 2005/0179968 A1 | * | 8/2005 | Molteni | G03H 1/2286 359/28 |
| 2013/0162637 A1 | * | 6/2013 | Son | G03H 1/08 345/419 |
| 2014/0085692 A1 | | 3/2014 | Lee et al. | |
| 2015/0146269 A1 | * | 5/2015 | Lee | G03H 1/2294 359/9 |
| 2016/0049170 A1 | * | 2/2016 | Fujita | G11B 7/1374 369/103 |

FOREIGN PATENT DOCUMENTS

JP 2011070720 B2 4/2011
KR 1020110058476 A 6/2011

OTHER PUBLICATIONS

Soohyun Lee et al., Measurement of Depth Representation Using Integral Imaging for Quality Evaluation of Computer-Generated Hologram, Three-Dimensional Imaging, Visualization, and Display 2014, May 5, 2014, vol. 9117, SPIE.

* cited by examiner

*Primary Examiner* — Tarifur Chowdhury
*Assistant Examiner* — Jonathon Cook
(74) *Attorney, Agent, or Firm* — William Park & Associates Ltd.

(57) ABSTRACT

An apparatus and a method for measuring quality of a holographic image are disclosed. The apparatus for measuring the quality of the holographic image may include an obtaining unit to obtain a hologram, a reconstruction unit to reconstruct a three-dimensional (3D) holographic image by irradiating the hologram with a light source, a measuring unit to measure depth of the reconstructed holographic image, and an analysis unit to analyze depth representation quality of the holographic image base on the measured depth of the holographic image.

18 Claims, 5 Drawing Sheets

APPARATUS AND METHOD FOR MEASURING QUALITY OF HOLOGRAPHIC IMAGE

CROSS-REFERENCE TO RELATED APPLICATION

This application claims the priority benefit of Korean Patent Application No. 10-2014-0103922, filed on Aug. 11, 2014, in the Korean Intellectual Property Office, the disclosure of which is incorporated herein by reference.

BACKGROUND

1. Field of the Invention

Embodiments of the present invention relate to a method for measuring depth representation quality of a reconstructed image of a hologram.

2. Description of the Related Art

Holographic display is an ideal type of three-dimensional (3D) display technology, which reproduces wavefronts by an object using diffraction and interference of light as they are to provide effects as if the object is actually present before the user eyes. In particular, unlike a stereoscopic mode generally used in current 3D display industry, holographic display technology does not involve vergence-accommodation conflicts which cause fatigue and dizziness, allows different images to be observed depending on viewpoints, and does not need ancillary devices (for example, glasses) for view to allow a plurality of users to view images.

However, due to current difficulty in realizing an ideal holographic display, most studies related to holographic displays are being conducted on a display element or a novel holographic display system configured by combining a commercially available display with optical and mechanical devices. In addition, studies associated with a field of generation of a hologram used as content for a holographic display focus mainly on improvement in computational speed or decrease in computational complexity. For the continuous advancement and final commercial availability of holographic display technology in the future, it is essential to establish criteria for evaluating the qualities of images reproduced on a holographic display as well as to conduct the studies, whereas studies on quality evaluation of reproduced holographic images are inadequate yet.

Elements of the quality of a reproduced holographic image may include, for example, the size, brightness, sharpness, noise, viewing angle and depth of the image. In particular, depth representation among the elements of the quality of the reproduced holographic image is one of main properties of a holographic display as a 3D image medium, and the accuracy of depth is a main factor determining the quality of the holographic image.

Thus, to evaluate the quality of a holographic image, a technique for easily measuring the depth of the holographic image is needed.

SUMMARY

An aspect of the present invention is to reconstruct a holographic image using a hologram and to easily analyze depth representation quality of the holographic image based on a result of comparing depth of the reconstructed image with depth of an original image.

According to an aspect of the present invention, there is provided an apparatus for measuring quality of a holographic image, the apparatus including an obtaining unit to obtain a hologram, a reconstruction unit to reconstruct a three-dimensional (3D) holographic image by irradiating the hologram with a light source, a measuring unit to measure depth of the reconstructed holographic image, and an analysis unit to analyze depth representation quality of the holographic image based on the measured depth of the holographic image.

The analysis unit may compare the depth of the holographic image with depth of an original image associated with an object and analyze the depth representation quality based on a comparison result.

The obtaining unit may receive input of red, green and blue (RGB) brightness information and 3D stereoscopic information on an object and obtain the hologram using the input RGB brightness information and 3D information.

The obtaining unit may include a beam splitter to equally split beams to respectively transmit the beams to an object and a mirror, and a camera to obtain the hologram corresponding to an interference pattern of beams reflected from the object with respect to beams reflected from the mirror.

The reconstruction unit may include a laser unit to generate a laser as the light source; a collimator to output the generated laser as enlarged plane waves, a spatial light modulator (SLM) to reflect light modulated from the plane waves into a space when the enlarged plane waves are incident, and a beam splitter to change a direction of at least part of the light reflected from the SLM to spread the light to an empty space.

The measuring unit may detect 3D information from the reconstructed holographic image and measure the depth of the reconstructed holographic image using the detected 3D information.

The measuring unit may include a lens array comprising a plurality of lenses disposed at different positions to receive light associated with the reconstructed holographic image and to spread the light to different positions depending on a direction of the received light, and an image sensor to receive at least part of the spread light and to detect a plurality of elemental images as the 3D information using the received light.

The measuring unit may further include a measuring module unit to detect the same object points from the elemental images and to compare positional differences among the object points to measure the depth of the holographic image.

The measuring unit may include a measuring module unit to spread light rays associated with the elemental images to a virtual pinhole array which transmit only light rays at certain angles depending on a position of a pixel to identify distribution of the transmitted light rays on various depth surfaces, to obtain focal images on the depth surfaces based on the identified distribution, and to detect a depth surface on which a focus of an object is formed to measure the depth of the holographic image.

According to an aspect of the present invention, there is provided a method of measuring quality of a holographic image, the method including obtaining a hologram, reconstructing a 3D holographic image by irradiating the hologram with a light source, measuring depth of the reconstructed holographic image, and comparing the measured depth of the holographic image with depth of an original image and analyzing depth representation quality of the holographic image based on a comparison result.

According to an aspect of the present invention, a holographic image may be reconstructed using a hologram and depth representation quality of the holographic image may be easily analyzed based on a result of comparing depth of the reconstructed image with depth of an original image.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, various embodiments of the present invention will be described in detail with reference to the accompanying drawings, but the present invention is not limited or restricted by the embodiments.

Figure 1:
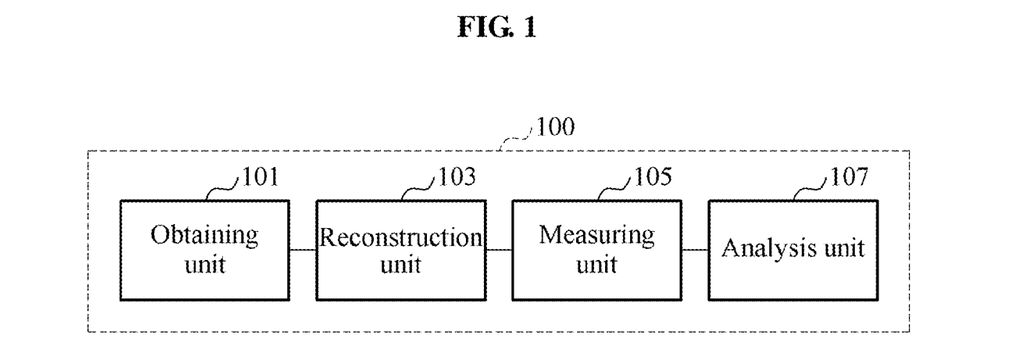
FIG. 1 illustrates a configuration of an apparatus for measuring quality of a holographic image according to an embodiment of the present invention.

FIG. 1 illustrates a configuration of an apparatus for measuring quality of a holographic image according to an embodiment of the present invention.

Referring to FIG. 1, the apparatus for measuring the quality of the holographic image according to the embodiment may include an obtaining unit 101, a reconstruction unit 103, a measuring unit 105 and an analysis unit 107.

Figure 2:
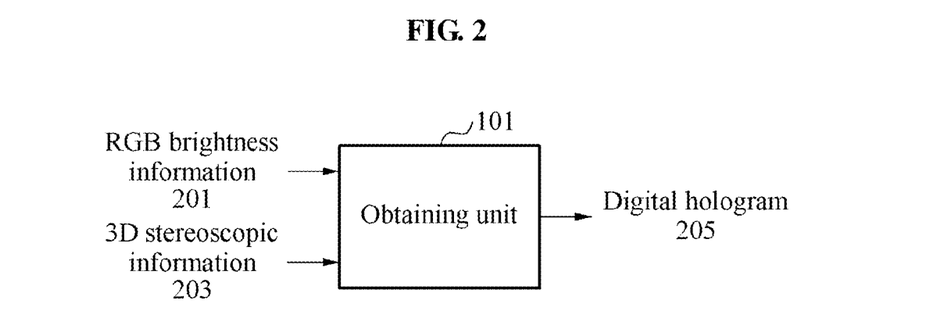
FIG. 2 illustrates an example of generating a hologram in the apparatus for measuring the quality of the holographic image.

The obtaining unit 101 may obtain a hologram through computation or directly by an optical method. Here, the obtaining unit 101 may receive input of red, green and blue (RGB) brightness information and three-dimensional (3D) information on an object to obtain a hologram based on the input information through computation, or may directly obtain a hologram by an optical method. For example, as illustrated in FIG. 2, the obtaining unit 101 may receive input of RGB brightness information 201 on a 3D object and various forms of 3D information 203, such as a depth map, point cloud data or 3D mesh model-based data, as input information and perform computation using the input information, thereby generating a digital hologram 205.

When a hologram is obtained through computation, the obtaining unit 101 may generate the hologram using various algorithms, for example, obtain the hologram using a method of calculating intensity of an interference pattern between a planar reference wave and an object wave as in Equation 1. Here, the obtaining unit 101 may receive input of 3D object data in a point cloud form and superimpose interference patterns of object points which are present at $(x_j, y_j, z_j)$ and have an intensity of $A_j$ on a hologram plane to calculate a hologram pattern $(I(x_a, y_a))$.

$$I(x_a, y_a) = \sum_{j=1}^{N} A_j \cos\left\{2\pi\left[\frac{1}{2\lambda z_j}((x_a - x_j)^2 + (y_a - y_j)^2)\right]\right\} \quad \text{[Equation 1]}$$

Figure 3:
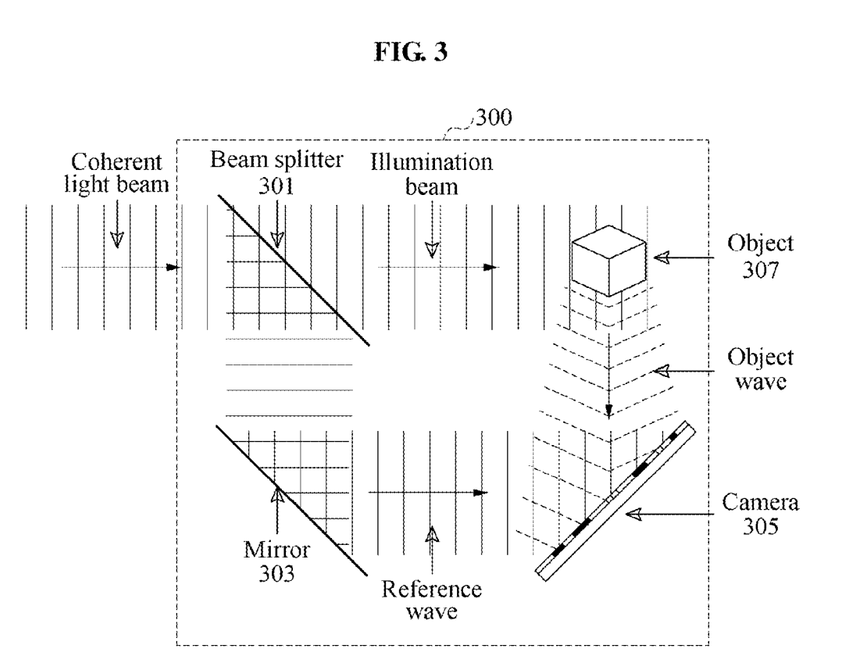
FIG. 3 illustrates an example of an obtaining unit in the apparatus for measuring the quality of the holographic image according to an embodiment of the present invention.

When a hologram is obtained by an optical method, the obtaining unit 101 may obtain a digital hologram on an object by a method of capturing an interference pattern between a reference wave and an object wave using a charge-coupled device (CCD) camera, an optical scanning method or the like, or obtain an analog hologram on an object by recording an interference pattern on a recording medium, such as a film. For instance, as illustrated in FIG. 3, the obtaining unit 101 may capture interference patterns between reference waves and object waves using a CCD camera to directly obtain a digital hologram.

The reconstruction unit 103 may irradiate the obtained hologram with a light source, such as a laser, a light emitting diode (LED) or white light, to optically reconstruct a 3D holographic image. The reconstruction unit 103 may include a light source unit to provide a light source, for example, a laser or an LED, for optical reconstruction of the digital hologram, a spatial light modulator (SLM), and an optical system, such as a lens and a mirror.

The measuring unit 105 may capture the optically reconstructed 3D holographic image by an integral imaging technique to detect 3D information, for example, an elemental image, and measure depth of the reconstructed 3D holographic image using the 3D information. In detail, the measuring unit 105 may include a lens array, an image sensor and a measuring module unit.

The lens array may include a plurality of lenses disposed at different positions to receive light associated with the reconstructed holographic image and to spread the light to different positions depending on a direction of the received light. Here, the light associated with the reconstructed holographic image may be light spread by the SLM modulating a laser generated from the light source unit in the reconstruction unit 103.

The image sensor may receive at least part of the spread light and generate a plurality of elemental images as the 3D information using the received light.

The measuring module unit may detect the same object points from the plurality of elemental images and compare positional differences among the object points to measure the depth of the holographic image.

Alternatively, the measuring module unit may calculate distribution of spread light rays passing through a pinhole array on various depth surfaces, obtain focal images on the depth surfaces based on the calculated distribution, and detect a depth surface on which a focus of the object is formed from the focal images, thereby measuring the depth of the holographic image.

The analysis unit 107 may analyze depth representation quality of the holographic image based on the measured depth of the holographic image. Here, the analysis unit 107 may compare the measured depth of the holographic image with depth of an original image associated with the object and analyze the depth representation quality based on a comparison result.

The analysis unit 107 may provide a function of evaluating how accurately the depth of the original object is reproduced through hologram reproduction by comparing depth information on the optically reconstructed holographic image measured by the measuring unit 105 with original depth information on the object.

In detail, the analysis unit 107 may obtain a relationship between the original depth and the measured depth and analyze results, such as linear/nonlinear characteristics in a depth axis direction, depth representation accuracy of the reconstructed image depending on a position in horizontal-vertical axis directions, depth representation accuracy depending on an viewing angle and depth resolution by depth, thereby evaluating hologram signal processing algorithms for hologram generation and compression/encoding or the like, optical hologram obtaining environments, and a holographic display system. The analysis unit 107 may analyze factors causing quality deterioration based on an evaluation result to effectively utilize the factors for quality improvement.

Figure 5:
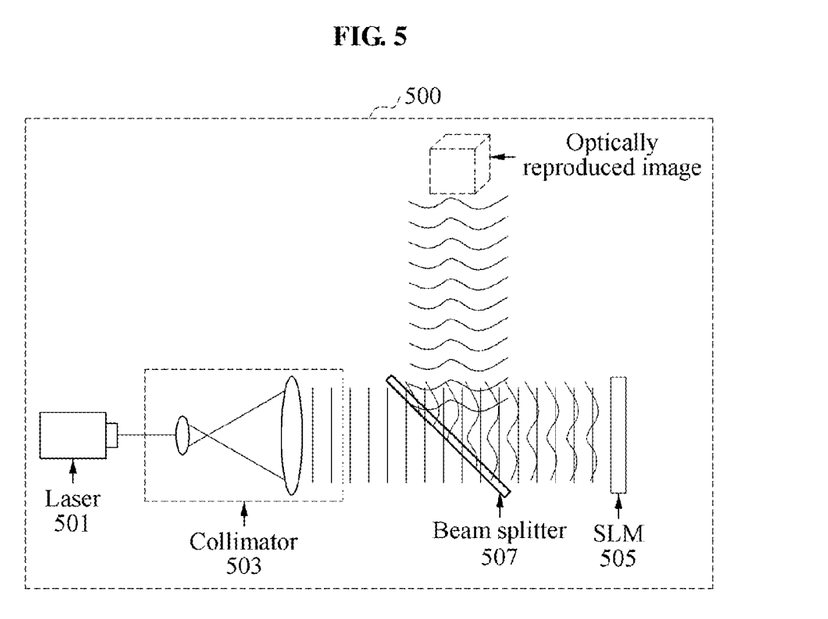
FIG. 5 illustrates an example of a reconstruction unit in the apparatus for measuring the quality of the holographic image according to an embodiment of the present invention.

For example, as illustrated in FIG. 5, when the hologram generated using Equation 1 is optically reconstructed into a 3D holographic image using the reconstruction unit 103 including a laser, a collimator, an SLM and a beam splitter, the analysis unit 107 may analyze a wavelength of the light source, a position (in a depth direction and horizontal-vertical directions) and distortion extent of a collimator lens, and hologram generation input parameters (wavelength, pixel pitch and depth value per unit) as factors affecting depth representation accuracy when the image reproduced through reconstruction is analyzed.

Here, when the depth information on the reconstructed holographic image and the depth information on the object of the original image associated with the object have a linear relationship in the depth axis direction and are different from each other, a quality deterioration factor is highly likely to be the wavelength of the light source, or the depth value per unit or wavelength among the hologram generation parameters. However, when the depth information on the reconstructed image and the depth information on the original object have a nonlinear relationship, a quality deterioration factor is highly likely to be one of the position of the collimator lens and size of the pixel pitch depending on the relationship.

In addition, when the depth representation accuracy of the reconstructed image varies depending on a position in the horizontal-vertical axis directions, a quality deterioration factor is highly likely to be distortion of the collimator lens.

Consequently, the analysis unit 107 may compare the depth information on the original object with the depth information on the reproduced holographic image to obtain a relationship therebetween, thereby efficiently analyzing quality deterioration factors.

The apparatus 100 for measuring the quality of the holographic image according to the embodiment may measure the depth of the optically reconstructed 3D holographic image and compare the measured depth information on the 3D holographic image with the depth information on the 3D original object to objectively evaluate depth representation quality of the hologram. Depth representation quality evaluation may be effectively utilized for performance enhancement of hologram signal processing algorithms for hologram generation and compression/encoding, improvement in direct hologram obtaining environments, and improvement in optical performance of a holographic display.

FIG. 3 illustrates an example of an obtaining unit in the apparatus for measuring the quality of the holographic image according to an embodiment of the present invention.

Referring to FIG. 3, the obtaining unit 300 in the apparatus for measuring the quality of the holographic image may include a beam splitter 301, a mirror 303 and a camera 305.

The beam splitter 301 may equally split and transmit a light beam to an object 307 and the mirror 303, respectively. That is, when a coherent light beam is input, the beam splitter 301 may divide the input coherent light beam, and transmit part of the coherent light beam to the object 307 as an illumination beam and remaining part of the coherent light beam to the mirror 303. Here, the object 307 may generate an object wave based on the illumination beam and transmit the object wave to the camera 305.

The mirror 303 may reflect the beam provided from the beam splitter 301 to provide the beam to the camera 305 as a reference wave.

The camera 305 may be, for example, a CCD camera, and obtain a digital hologram of the object 307 using the object wave provided from the object 307 and the reference wave provided from the mirror 303. Here, the camera 305 may obtain the hologram corresponding to an interference pattern of the beam reflected from the object 307 with respect to the beam reflected from the mirror 303.

Figure 4:
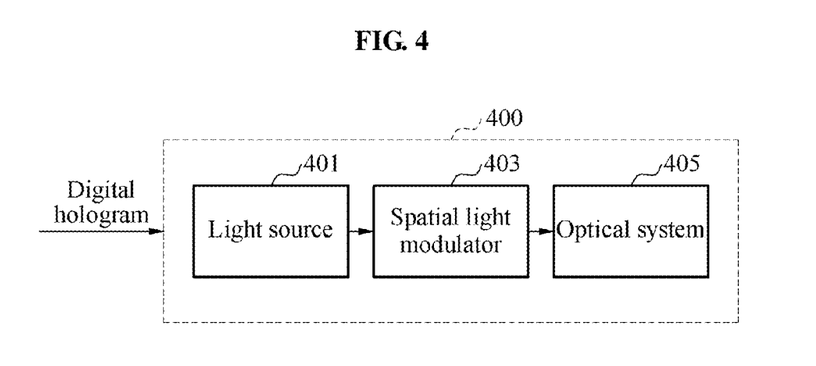
FIG. 4 illustrates a configuration of a reconstruction unit in the apparatus for measuring the quality of the holographic image according to an embodiment of the present invention.

FIG. 4 illustrates a configuration of a reconstruction unit in the apparatus for measuring the quality of the holographic image according to an embodiment of the present invention.

Referring to FIG. 4, the reconstruction unit 400 in the apparatus for measuring the quality of the holographic image may include a light source unit 401 to provide a light source, such as a laser, an LED and white light, an SLM 403, and an optical system 405, such as a lens and a mirror.

When a digital hologram, for example, a fringe pattern, is input, the reconstruction unit 400 may irradiate the digital hologram with the light source to optically reconstruct a 3D holographic image.

FIG. 5 illustrates an example of a reconstruction unit in the apparatus for measuring the quality of the holographic image according to an embodiment of the present invention.

Referring to FIG. 5, the reconstruction unit 500 in the apparatus for measuring the quality of the holographic image is a device capable of optically reconstructing a hologram, which may include a laser unit 501, a collimator 503, an SLM 505 and a beam splitter 507.

The laser unit 501 may generate a laser to irradiate a hologram with the laser. Here, the hologram may be present at a position of the SLM.

The collimator 503 may output the generated laser as an enlarged plane wave.

The SLM 505 may be a display which displays the hologram, and may reflect light modulated from the incident plane wave into a space when the plane wave output from the collimator 503 pass through the beam splitter 507 to be incident.

The beam splitter 507 may allow the output plane wave to pass therethrough to transmit the plane wave to the SLM 505. In addition, the beam splitter 507 may separate at least part of the light reflected from the SLM 505 by changing a direction thereof to form an image at a desired position, thereby reconstructing a holographic image.

For optical reconstruction of an analog hologram, the apparatus for measuring the quality of the holographic image may irradiate a medium recording the hologram with an LED or white light at an appropriate angle, thereby reproducing a 3D holographic image.

Figure 6:
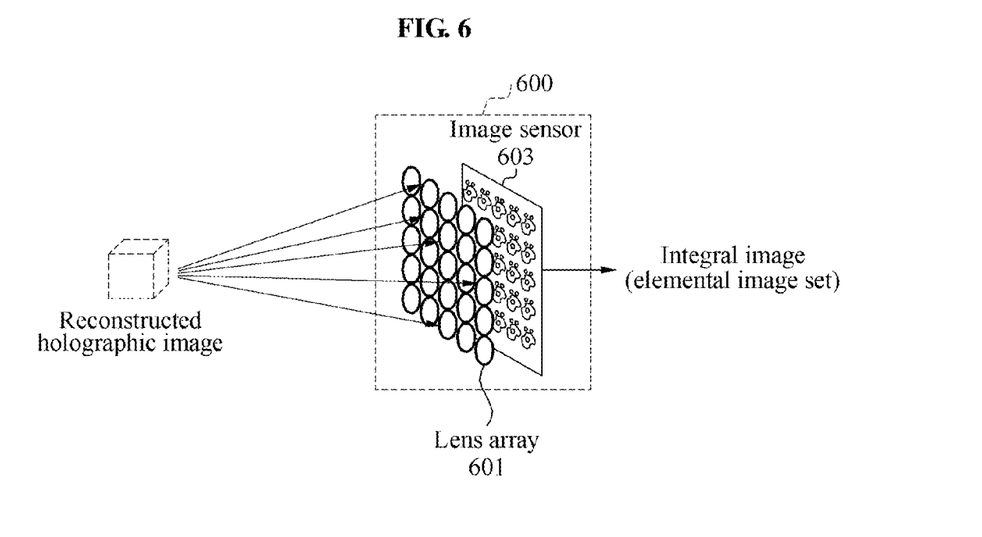
FIG. 6 illustrates an example of a measuring unit in the apparatus for measuring the quality of the holographic image according to an embodiment of the present invention.

FIG. 6 illustrates an example of a measuring unit in the apparatus for measuring the quality of the holographic image according to an embodiment of the present invention.

Referring to FIG. 6, the measuring unit 600 in the apparatus for measuring the quality of the holographic image is a device which measures depth of an optically reconstructed image of a hologram, which may include a lens array 601, for example, a microlens array (MLA), and an image sensor 603.

The measuring unit 600 may capture a reconstructed holographic image using an integral imaging technique.

When a 3D object is captured as an integral image, the measuring unit 600 may detect elemental images from the image sensor 603 through the lens array 601. Here, the elemental images are images recorded as light (light rays) incident through respective lenses disposed at different positions are split by directions. Further, an integral image refers to an image recording all the elemental images.

That is, the measuring unit 600 may capture the reconstructed holographic image by applying the integral imaging technique to obtain light ray distribution information by direction and position of the reconstructed holographic image, thereby generating 3D information.

Subsequently, the measuring unit 600 may extract and measure depth information from the 3D information on the optically reconstructed image of the hologram, in which various methods may be used to measure the depth information.

The measuring unit 600 may measure depth by detecting the same object points from the respective elemental images, for example, using a measuring module unit, and comparing positional differences among the detected object points, or may measure depth by discovering a depth surface on which a focus of an object point is formed from focal images on various depth surfaces based on a computational integral imaging reconstruction (CIIR) technique, thereby measuring the depth information.

When a depth measuring method based on the CIIR technique is used, to optically reconstruct an integral image, the measuring unit 600 may calculate focal images at different depths assuming that a virtual pinhole array is disposed in front of the integral image.

Here, a distance between an elemental image and a pinhole is assumed to be a focal distance of a lens of the lens array used for obtaining, and only light rays in certain directions may pass through the pinhole depending on a position of each pixel of the elemental image.

Figure 7:
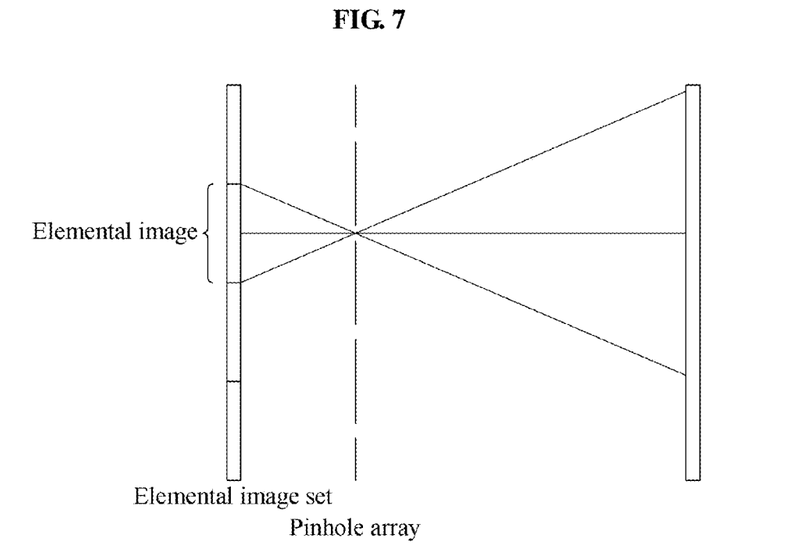
FIG. 7 illustrates spreading characteristics of light rays used to measure depth of a holographic image by a measuring unit in the apparatus for measuring the quality of the holographic image according to an embodiment of the present invention.

The measuring unit 600 may calculate a spreading process of the light rays with all pixels of the integral image to obtain intensity distribution, that is, distribution of spread light rays, on a random depth surface, thereby obtaining a focal image on the depth surface. The measuring unit 600 may find a depth surface on which a focus of an object is properly formed from the focal images to measure depth.

Figure 8:
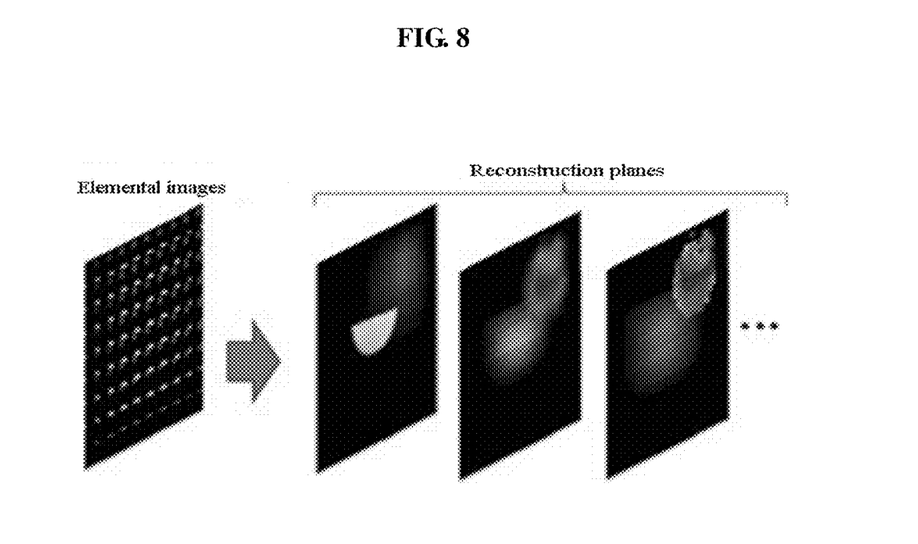
FIG. 8 illustrates an example of focal images obtained in the apparatus for measuring the quality of the holographic image according to an embodiment of the present invention.

FIG. 8 illustrates an example of focal images obtained in the apparatus for measuring the quality of the holographic image according to an embodiment of the present invention.

Referring to FIG. 8, the apparatus for measuring the quality of the holographic image may obtain focal images on different depth surface using the CIIR technique.

It is identified through the focal images obtained from an integral image that focuses of two different objects may be properly formed on different depth surfaces.

Based on this, the apparatus for measuring the quality of the holographic image may measure depth of each object.

Figure 9:
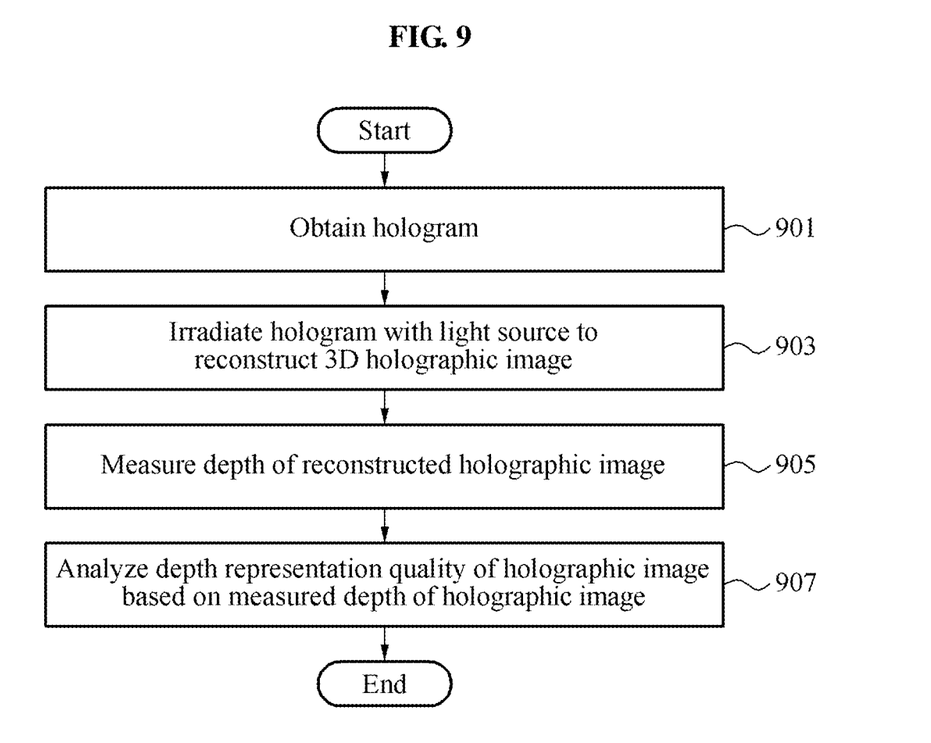
FIG. 9 is a flowchart illustrating a method of measuring quality of a holographic image according to an embodiment of the present invention.

FIG. 9 is a flowchart illustrating a method of measuring quality of a holographic image according to an embodiment of the present invention.

Referring to FIG. 9, in operation 901, an apparatus for measuring quality of a holographic image may obtain a hologram.

Here, the apparatus for measuring the quality of the holographic image may receive input of RGB brightness information and 3D information on an object and obtain the hologram using the input RGB brightness information and 3D information.

The apparatus for measuring the quality of the holographic image may equally split light beams using a beam splitter to transmits the beams to the object and a mirror and obtain, using a camera, the hologram corresponding to an interference pattern of light beams reflected from the object with respect to beams reflected from the mirror.

In operation 903, the apparatus for measuring the quality of the holographic image may irradiate the hologram with a light source to reconstruct a 3D holographic image.

Here, the apparatus for measuring the quality of the holographic image may generate a laser as the light source through a laser unit and output the generated laser as enlarged plane waves through a collimator. In addition, when the enlarged plane waves are incident, the apparatus for measuring the quality of the holographic image may modulate and reflect the plane waves into a space through an SLM and spread, using a beam splitter, at least part of the modulated plane waves reflected by the SLM to an empty space by changing a direction thereof, thereby reconstructing the holographic image.

In operation 905, the apparatus for measuring the quality of the holographic image may measure depth of the reconstructed holographic image.

The apparatus for measuring the quality of the holographic image may generate 3D information from the reconstructed holographic image and measure the depth of the reconstructed holographic image using the generated 3D information.

When the 3D information is generated, the apparatus for measuring the quality of the holographic image may receive light associated with the reconstructed holographic image through a lens array to spread the light to different positions depending on a direction of the received light, and receive at least part of the spread light through an image sensor to detect a plurality of elemental images as the 3D information using the received light.

Further, when the depth of the holographic image is measured using the 3D information, the apparatus for measuring the quality of the holographic image may detect the same object points from the plurality of elemental images using a measuring module unit and compare positional differences among the object points to measure the depth of the holographic image.

Alternatively, when the depth of the holographic image is measured using the 3D information, the apparatus for measuring the quality of the holographic image may spread light rays associated with the plurality of elemental images to a virtual pinhole array which transmits only light rays at certain angles depending on a position of a pixel to identify distribution of the spread light rays on various depth surfaces, obtain focal images on the depth surfaces based on the identified distribution, and detect a depth surface on which a focus of the object is formed from the focal images, thereby measuring the depth of the holographic image.

In operation 907, the apparatus for measuring the quality of the holographic image may analyze depth representation quality of the holographic image based on the measured depth of the holographic image. Here, the apparatus for measuring the quality of the holographic image may compare the measured depth of the holographic image with depth of an original image and analyze the depth representation quality of the holographic image based on a comparison result.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

What is claimed is:

1. An apparatus for measuring quality of a holographic image, the apparatus comprising:
   an obtaining unit to obtain a hologram;
   a reconstruction unit to reconstruct a three-dimensional (3D) holographic image by irradiating the hologram with a light source;
   a measuring unit to measure depth of the reconstructed holographic image; and
   an analysis unit to analyze depth representation quality of the holographic image based on the measured depth of the holographic image.

2. The apparatus of claim 1, wherein the analysis unit compares the depth of the holographic image with depth of an original image associated with an object and analyzes the depth representation quality based on a comparison result.

3. The apparatus of claim 1, wherein the obtaining unit receives input of red, green and blue (RGB) brightness information and 3D information on an object and obtains the hologram using the input RGB brightness information and 3D information.

4. The apparatus of claim 1, wherein the obtaining unit comprises a beam splitter to equally split beams to respectively transmit the beams to an object and a mirror; and a camera to obtain the hologram corresponding to an interference pattern of beams reflected from the object with respect to beams reflected from the mirror.

5. The apparatus of claim 1, wherein the reconstruction unit comprises a laser unit to generate a laser as the light source; a collimator to output the generated laser as enlarged plane waves; a spatial light modulator (SLM) to reflect light modulated from the plane waves into a space when the enlarged plane waves are incident; and a beam splitter to change a direction of at least part of the light reflected from the SLM to spread the light.

6. The apparatus of claim 1, wherein the measuring unit detects 3D information from the reconstructed holographic image and measures the depth of the reconstructed holographic image using the detected 3D information.

7. The apparatus of claim 6, wherein the measuring unit comprises a lens array comprising a plurality of lenses disposed at different positions to receive light associated with the reconstructed holographic image and to spread the light to different positions depending on a direction of the received light; and an image sensor to receive at least part of the spread light and to detect a plurality of elemental images as the 3D information using the received light.

8. The apparatus of claim 7, wherein the measuring unit further comprises a measuring module unit to detect the same object points from the elemental images and to compare positional differences among the object points to measure the depth of the holographic image.

9. The apparatus of claim 7, wherein the measuring unit further comprises a measuring module unit to spread light rays associated with the elemental images to a virtual pinhole array which transmits only light rays at certain angles depending on a position of a pixel to identify distribution of the spread light rays on a depth surface, to obtain focal images on the depth surface based on the identified distribution, and to detect a depth surface on which a focus of an object is formed from the focal images to measure the depth of the holographic image.

10. A method of measuring quality of a holographic image, the method comprising:
obtaining a hologram;
reconstructing a three-dimensional (3D) holographic image by irradiating the hologram with a light source;
measuring depth of the reconstructed holographic image; and
analyzing depth representation quality of the holographic image based on the measured depth of the holographic image.

11. The method of claim 10, wherein the analyzing of the depth representation quality of the holographic image comprises comparing the depth of the holographic image with depth of an original image associated with an object and analyzing the depth representation quality based on a comparison result.

12. The method of claim 10, wherein the obtaining of the hologram comprises receiving input of red, green and blue (RGB) brightness information and 3D information on an object and obtaining the hologram using the input RGB brightness information and 3D information.

13. The method of claim 10, wherein the obtaining of the hologram comprises equally splitting, by a beam splitter, beams to respectively transmit the beams to an object and a mirror; and obtaining, by a camera, the hologram corresponding to an interference pattern of beams reflected from the object with respect to beams reflected from the mirror.

14. The method of claim 10, wherein the reconstructing of the holographic image comprises generating, by a laser unit, a laser as the light source; outputting, by a collimator, the generated laser as enlarged plane waves; reflecting, by a spatial light modulator (SLM), light modulated from the plane waves into a space when the enlarged plane waves are incident; and changing, by a beam splitter, a direction of at least part of the light reflected into the space to spread the light.

15. The method of claim 10, wherein the measuring of the depth of the reconstructed holographic image comprises detecting 3D information from the reconstructed holographic image and measuring the depth of the reconstructed holographic image using the detected 3D information.

16. The method of claim 15, wherein the detecting of the 3D information comprises receiving, by a lens array, light associated with the reconstructed holographic image to spread the light to different positions depending on a direction of the received light; and receiving, by an image sensor, at least part of the spread light and detecting a plurality of elemental images as the 3D information using the received light.

17. The method of claim 16, wherein the measuring of the depth of the reconstructed holographic image using the detected 3D information comprises detecting, by a measuring module unit, the same object points from the elemental images and comparing positional differences among the object points to measure the depth of the holographic image.

18. The method of claim 16, wherein the measuring of the depth of the reconstructed holographic image using the detected 3D information comprises spreading, by a measuring module unit, light rays associated with the elemental images to a virtual pinhole array which transmits only light rays at certain angles depending on a position of a pixel to identify distribution of the spread light rays on a depth surface, obtaining focal images on the depth surface based on the identified distribution, and detecting a depth surface on which a focus of an object is formed from the focal images to measure the depth of the holographic image.

* * * * *